(12) United States Patent
Trueman

(10) Patent No.: US 10,040,386 B2
(45) Date of Patent: Aug. 7, 2018

(54) VACUUM TRUCK TANK SECUREMENT SYSTEM AND METHOD

(71) Applicant: Wastequip LLC, Charlotte, NC (US)

(72) Inventor: Geoffrey M. Trueman, Richmond Hill (CA)

(73) Assignee: WASTEQUIP, LLC, Charlotte, NC (US)

( * ) Notice: Subject to any disclaimer, the term of this patent is extended or adjusted under 35 U.S.C. 154(b) by 0 days.

(21) Appl. No.: 15/185,462

(22) Filed: Jun. 17, 2016

(65) Prior Publication Data
US 2017/0361754 A1 Dec. 21, 2017

(51) Int. Cl.
*B60P 1/16* (2006.01)
*B60P 3/22* (2006.01)

(52) U.S. Cl.
CPC .............. *B60P 3/2215* (2013.01); *B60P 1/16* (2013.01)

(58) Field of Classification Search
CPC ................................ B60P 3/2215; B60P 1/16
USPC ..... 298/38, 17 R, 22 R, 18, 22 P; 296/183.2; 410/80
See application file for complete search history.

(56) References Cited

U.S. PATENT DOCUMENTS

| | | | | |
|---|---|---|---|---|
| 4,084,852 A | * | 4/1978 | Prosek | B60P 1/16 298/22 C |
| 5,454,620 A | * | 10/1995 | Hill | B60P 1/04 298/17 R |
| 5,829,946 A | * | 11/1998 | McNeilus | B60P 1/16 410/80 |
| 6,752,467 B1 | * | 6/2004 | Palrose | B60P 1/34 298/11 |
| 6,905,175 B1 | * | 6/2005 | Verros | B60P 1/165 298/17.7 |

* cited by examiner

*Primary Examiner* — Stephen Gordon
(74) *Attorney, Agent, or Firm* — Nelson Mullins Riley & Scarborough LLP

(57) ABSTRACT

Systems and methods for securing a tank to a chassis. In an embodiment, a vehicle includes a chassis and a tank having a proximal end and a distal end. The proximal end is coupled with the chassis for pivotal movement with respect thereto. The vehicle also includes a structural pad coupled to the tank and at least one rib extending from the structural pad. The at least one rib has at least one aperture defined therethrough. At least one fluid cylinder is coupled with the chassis. The at least one fluid cylinder is coupled with a pin aligned with the aperture. Actuation of the at least one fluid cylinder causes the pin to move between a first position wherein the pin is not received within the aperture and a second position wherein the pin is received within the aperture.

8 Claims, 11 Drawing Sheets

VACUUM TRUCK TANK SECUREMENT SYSTEM AND METHOD

FIELD OF THE INVENTION

Embodiments of the present invention relate to mobile vacuum equipment, including but not limited to vacuum trucks for collecting and transferring sludge, slurries, mud, gravel, solid and liquid waste, and other flowable materials. In particular, embodiments of the invention relate to a system for securing a tank to a chassis, such as the chassis of a vacuum truck.

BACKGROUND

As is known, mobile vacuum equipment is used for industrial, commercial, and environmental applications for collecting, transporting, and unloading various flowable materials, including sludge, slurries, mud, gravel, and solid and liquid waste. Trucks, such as vacuum trucks, are often used to carry such mobile vacuum equipment. One example of a conventional vacuum truck is illustrated in FIG. 1.

Referring to FIG. 1, a mobile vacuum truck 10 includes a cylindrical tank 12 that has a hinged connection 14 to the chassis 16 of truck 10 at a rear end of truck 10. As shown, tank 12 has a closed end, or head, 18, and an open end 20. A hatch or door 22 is operative to open and close to releasably seal open end 20.

Tank 12 is in fluid communication with a vacuum and filtration system 24. Vacuum system 24 typically comprises a vacuum pump, such as a hydraulically-driven air or liquid-cooled vane pump, a positive displacement blower, or a liquid ring vacuum pump with air filtration equipment, as is well known. During operation of vacuum system 24, material is drawn into tank 12. As shown in FIG. 1, when tank 12 is to be emptied, a hydraulic cylinder 26 proximate head 18 of tank 12 can be actuated to hoist or tilt tank 12 upward about the hinged connection 14 while the door 22 is opened. Thus, the collected material in tank 12 can be discharged therefrom.

In conventional mobile vacuum equipment, as is the case with truck 10 of FIG. 1, the tank 12 is secured to chassis 16 only via the hinged connection 14. Head 18 of tank 12 merely rests on chassis 16, and head 18 is maintained in place either by the weight of tank 12 or via hydraulic cylinder 26.

SUMMARY

According to one embodiment, the present invention provides a vehicle comprising a chassis and a tank having a proximal end and a distal end. The proximal end is coupled with the chassis for pivotal movement with respect thereto. The vehicle also comprises a structural pad coupled to the tank and at least one rib extending from the structural pad. The at least one rib has at least one aperture defined therethrough. At least one fluid cylinder is coupled with the chassis. The at least one fluid cylinder is coupled with a pin aligned with the aperture. Actuation of the at least one fluid cylinder causes the pin to move between a first position wherein the pin is not received within the aperture and a second position wherein the pin is received within the aperture.

According to a further embodiment, the present invention provides a vehicle comprising a chassis and a tank. The tank has a cross-section, a first end, and a second end, and the cross-section has a circumference. The tank is pivotally coupled with the chassis at a first end of the tank. The tank is operative to move between a first position at which the tank second end is proximate the chassis and a second position at which the tank second end is raised above the chassis. A locking mechanism is coupled with the chassis. At least one rib projects from the tank, and the at least one rib is disposed about a portion of the circumference of the tank cross-section. The locking mechanism and the at least one rib of the tank are in engagement when the tank is in the first position.

In yet another embodiment, the present invention provides a system for securing a tank to a chassis. The system comprises a tank assembly in selective locking engagement with a chassis assembly. The tank assembly comprises a rib coupled with the tank and disposed on an underside of the tank. The rib is generally perpendicular with a centerline of the tank. The chassis assembly comprises at least one lug disposed on the chassis and proximate the rib of the tank, and at least one fluid cylinder coupled with the chassis. The at least one fluid cylinder is operative to selectively lock the rib of the tank to the at least one lug.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
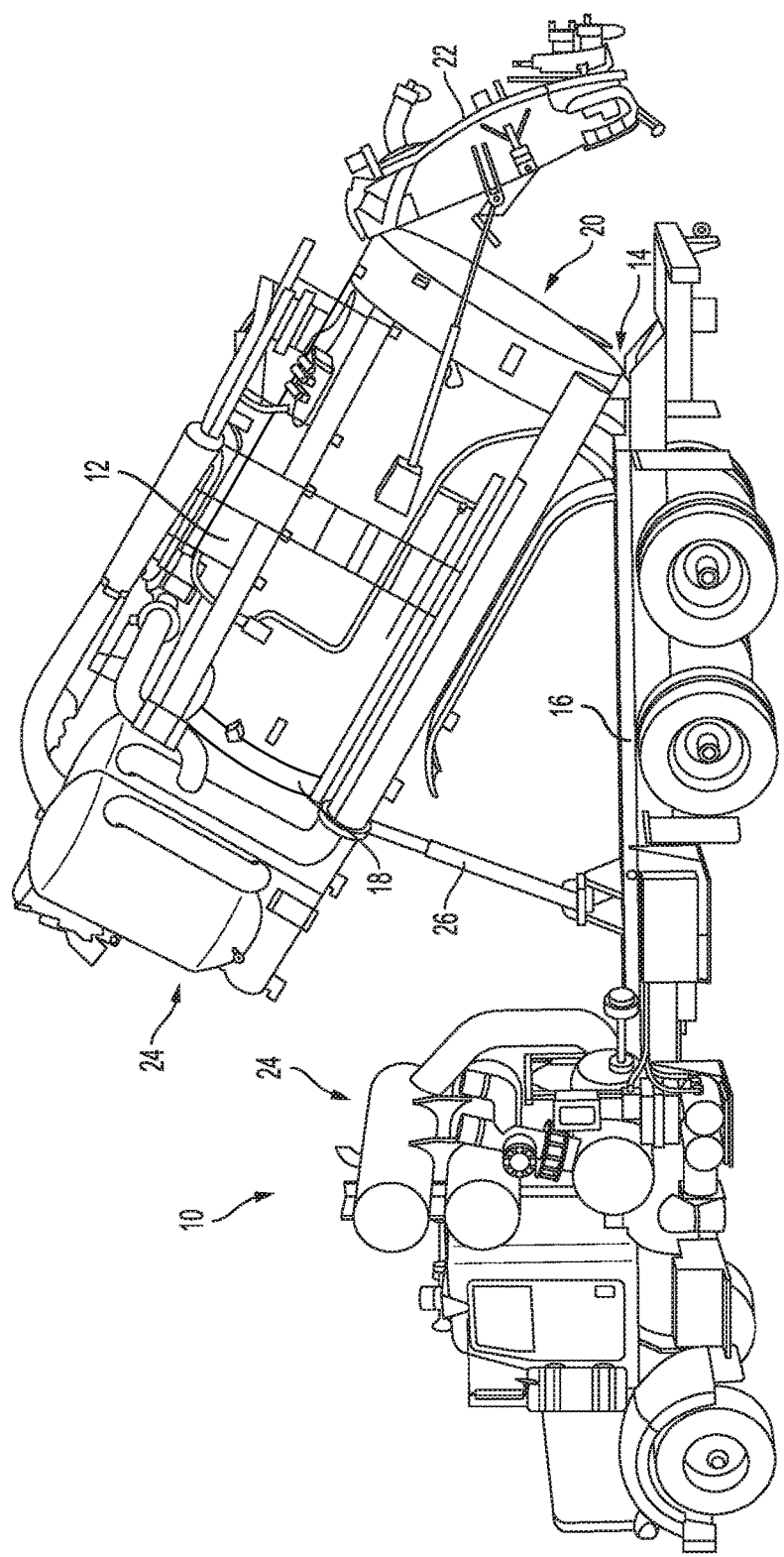
FIG. 1 is an elevation view of a conventional vacuum truck with which embodiments of the present invention may be utilized.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As noted above, in a conventional vacuum truck or trailer carrying a vacuum tank, the weight of the tank is relied upon to ensure that the tank remains on the chassis. However, in the event of an accident or rollover, the tank can lift away from the chassis and fracture at the hinge point. This may cause not only catastrophic damage to the equipment and/or spillage of the tank's contents, but also potentially detachment of the tank from the vehicle.

Accordingly, embodiments of the invention relate to systems and methods for securing a tank to a chassis. In one embodiment, a system for securing a tank to a chassis comprises a tank assembly in selective locking engagement with a chassis assembly. Some embodiments comprise one or more fluid-actuated cylinders coupled with the chassis and operative to move corresponding pin(s) into and out of engagement with a circumferential rib disposed on an underside of the tank. Thus, a tank securement assembly may anchor the lifting end of a tank to a chassis. In addition, in some embodiments, sensors may be in operative communication with the pins to detect whether the pins are retracted or engaged. Information from the sensors regarding the status of the pins may be communicated to a user by an indicator on the dashboard of the vehicle, for example. Accordingly, the tank may not be able to be lifted for dumping if any pins are engaged. Moreover, embodiments of the invention prevent the tank from separating from the chassis in emergency situations. Thus, in some embodiments, the securement mechanism will remain engaged even in the event of a fluid pressure loss in the fluid-actuated cylinders. To this end, the one or more hydraulic cylinders may have an internal spring that is strong enough to keep each cylinder extended during fluid pressure failure. These and other aspects of embodiments of the present invention are discussed in more detail below.

Some embodiments of the present invention are particularly suitable for use with mobile vacuum equipment, such as trucks and trailers carrying vacuum collection tanks, and preferred embodiments are discussed in that context below. However, those of skill in the art will understand that the present invention is not so limited. In fact, it is contemplated that embodiments of the present invention be used with any type of tank that has an end pivotably coupled with a chassis. Additionally, it is contemplated that the present invention be used with skid-mounted vacuum collection tanks.

Figure 2:
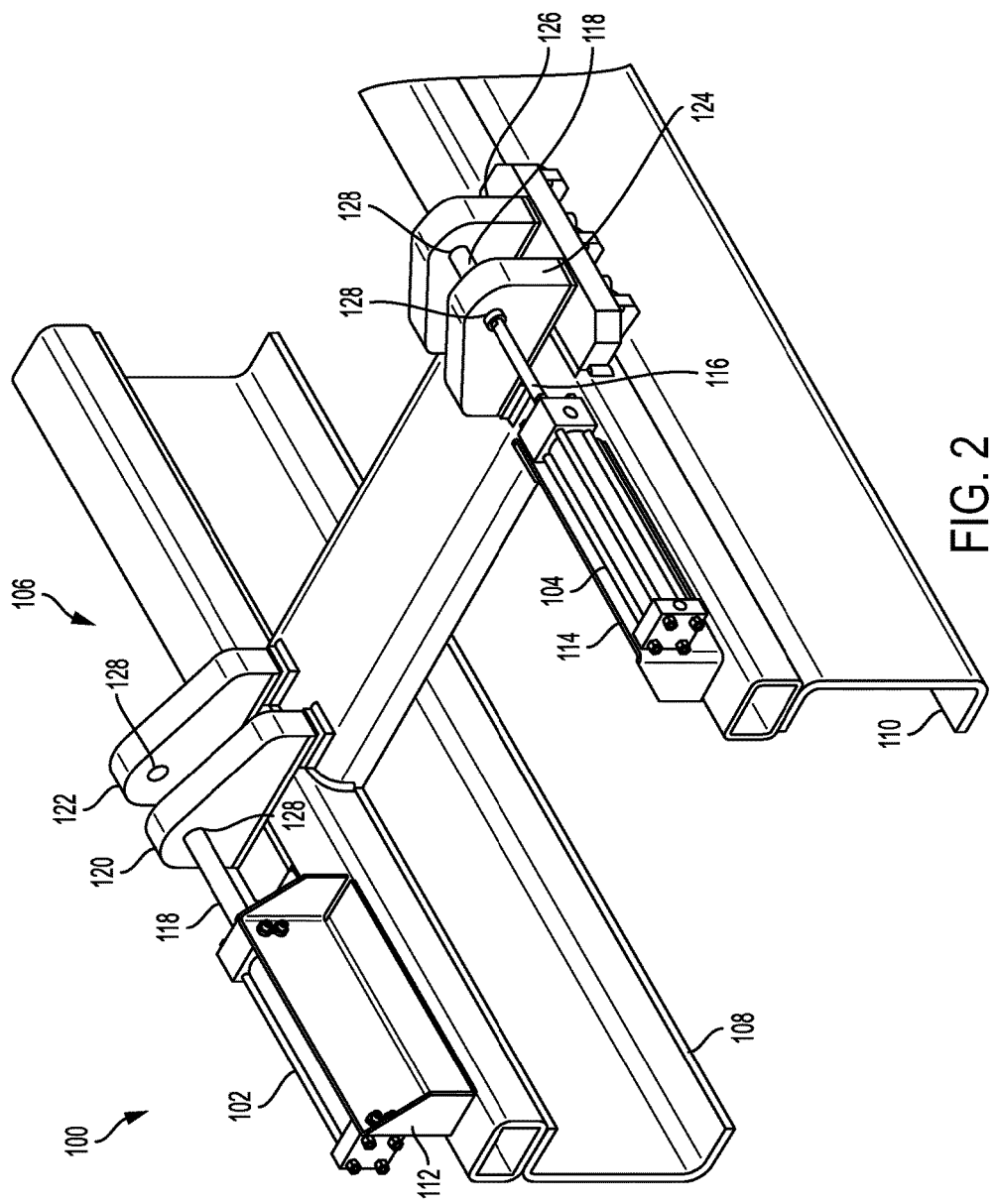
FIG. 2 is a partial perspective view of a chassis assembly according to an embodiment of the present invention.

Turning now to the drawings, FIG. 2 is a partial perspective view of a chassis-mounted assembly 100 according to an embodiment of the present invention. In this embodiment, chassis assembly 100 comprises a pair of fluid cylinders 102, 104 coupled with a chassis 106. In a preferred embodiment, fluid cylinders 102, 104 may be hydraulic cylinders of the rod-type in fluid communication with a source of hydraulic fluid. As described in more detail with reference to FIG. 11, for example, a vacuum truck may comprise a hydraulic system that includes a pump, a reservoir of hydraulic fluid, such as oil, and one or more hydraulic control valves. It will be appreciated that, in other embodiments, fluid cylinders 102, 104 may be pneumatically-actuated or electromechanically actuated.

As shown, chassis 106 comprises a pair of parallel, spaced-apart longitudinal rails 108, 110. However, those of skill in the art will appreciate that, in other embodiments, the present invention may be configured for use with any standard truck chassis and/or subframe. In the embodiment shown in FIG. 2, fluid cylinders 102, 104 are coupled with rails 108, 110 via adjustable cylinder support brackets 112, 114, respectively. Cylinders 102, 104 are connected to brackets 112, 114 in this embodiment using suitable fasteners, such as bolts or the like. Brackets may be formed of steel or another suitable metal material.

As noted above, fluid cylinders 102, 104 may preferably be rod-type cylinders, and thus in the embodiment shown cylinders 102, 104 both comprise piston rods 116. Further, a pin 118 may be operatively connected with a distal end of each piston rod 116 for movement therewith. In one embodiment, pins 118 are preferably formed of hardened steel, or another suitable metal material. As described below, pins 118 may be used to releasably secure a tank to chassis 106.

In addition, fluid cylinders 102, 104 may preferably be spring-augmented hydraulic cylinders. In particular, a spring internal to each cylinder 102, 104 may preferably bias the respective piston rods 116 toward an extended position. Therefore, even if fluid pressure at either cylinder 102, 104 is lost, piston rods 116 will remain in an extended position. This may prevent a tank from disengaging from pins 118 in an emergency situation because pins 118 will remain engaged. In one preferred embodiment, cylinders 102, 104 are dual-acting, and the internal spring may augment extension of cylinders 102, 104 by hydraulic fluid when pressure at cylinders 102, 104 is present. Those of skill in the art are familiar with suitable commercially-available cylinders for this purpose.

In operation, cylinders 102, 104 may be placed in fluid communication with a source of fluid, such as hydraulic fluid. Actuation of one or more valves in the hydraulic system may cause the fluid to flow to and from cylinders 102, 104, as is well understood. Thereby, piston rods 116 may move between a retracted position and an extended position. In FIG. 2, piston rod 116 of cylinder 104 is shown in an extended position. The corresponding piston rod of cylinder 102 is in a retracted position, and thus is not shown in FIG. 2.

Chassis assembly 100 also preferably comprises at least one lug with which a pin 118 may engage. In FIG. 2, four such lugs are shown coupled with a subframe 119 of chassis 106 (see FIG. 3). In particular, first and second lugs 120, 122 are positioned over rail 108 of chassis 106, and third and fourth lugs 124, 126 are positioned over rail 110 of chassis 106 in this embodiment. Here, lugs 120, 122 are spaced apart along rail 108, and lugs 124, 126 are spaced apart along rail 110. Lug 120 may be in facing opposition to lug 124, and lug 122 may be in facing opposition to lug 126. It will be appreciated that the shape of lugs 120-26 may depend on the shape of the tank or vessel intended to be secured to chassis 106. For example, in the illustrated embodiment, lugs 120-26 have top surfaces that are inclined downward toward the center of chassis 106 in order to provide clearance for a cylindrical tank (see FIG. 8). However, those of skill in the art understand that lugs 120-26 may have different shapes in other embodiments, and they can select a suitable size and shape of lugs 120-26 based on the desired strength thereof and based on the size and shape of the vessel being carried on chassis 106 and other fastening/adjustment requirements. Further, instead of lugs 120-26 in some embodiments, a respective pair of lugs 120, 122 and/or 124, 126 may be replaced by a suitable bracket or clevis connection.

Each lug 120-26 preferably has an aperture 128 defined therein. Lugs 120-26 are preferably disposed on chassis 106 with respect to cylinders 102, 104 such that centerlines of piston rods 116 and/or pins 118 are aligned with apertures 128. Correspondingly, apertures 128 are preferably sized to receive pins 118 therein. As can be seen in FIG. 2, when piston rod 116 of cylinder 104 is moved to an extended position, pin 118 passes through and is received in apertures 128 of lugs 124, 126. Likewise, when piston rod 116 of cylinder 102 is moved to a retracted position, pin 118 may no longer be received in apertures 128 of lugs 120, 122. Alternatively, in some embodiments, when piston rods 116 of cylinders 102, 104 are retracted, pins 118 may remain partially or fully engaged with lugs 120, 124 but not engaged with lugs 122, 126.

Figure 3:
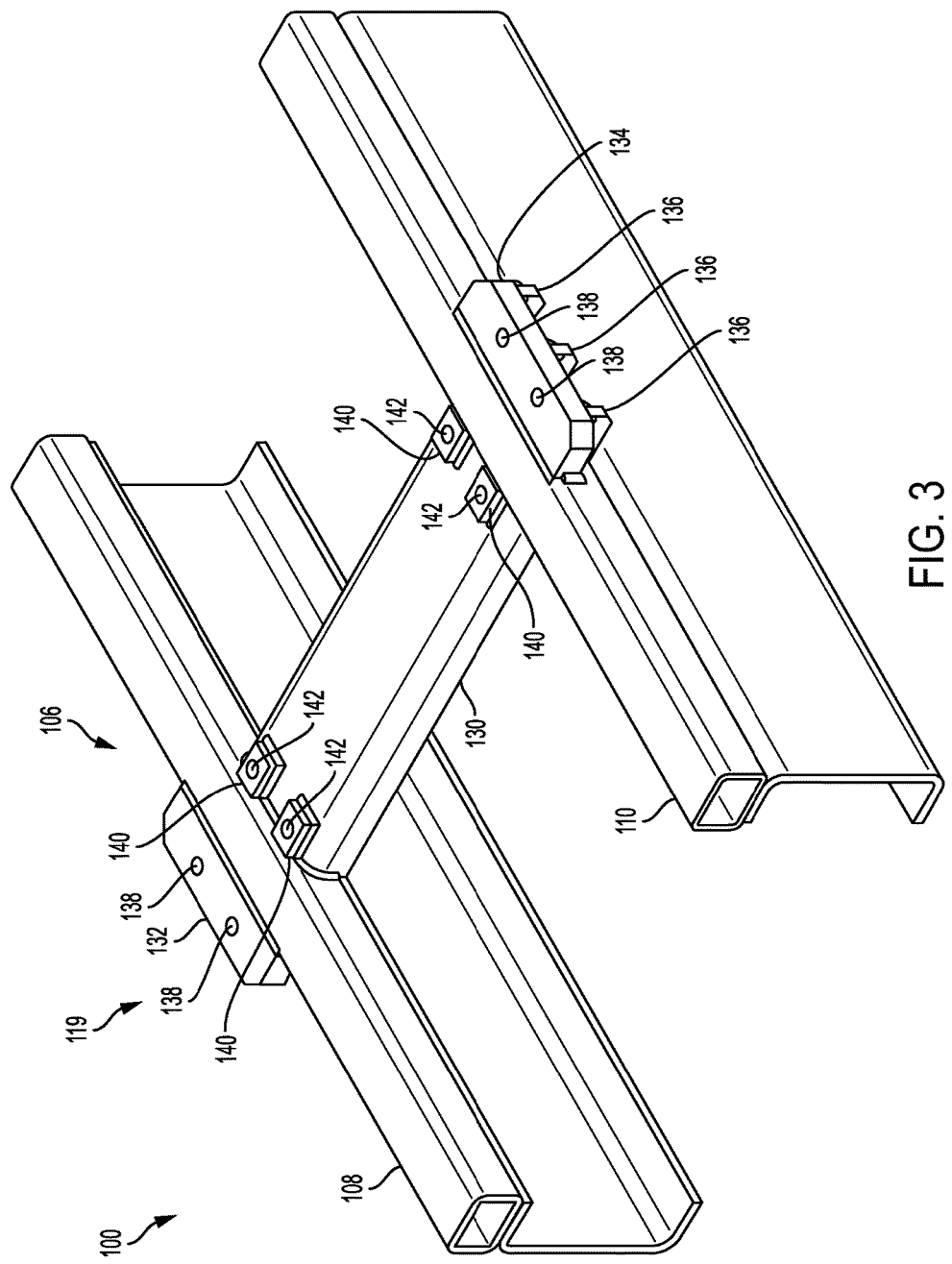
FIG. 3 is a partial perspective view of the chassis assembly of FIG. 2, wherein the fluid cylinders, spacers, supports, and lugs are removed.

FIG. 3 is a partial perspective view of chassis assembly 100 of FIG. 2. In this figure, fluid cylinders 102, 104 and lugs 120-26 are not shown in order to facilitate explanation of an embodiment of subframe 119 of chassis 106. Here, subframe 119 comprises a rectangular inner base 130 that extends perpendicularly between rails 108, 110. Subframe 119 may also comprise polygonal outer bases 132, 134 that are respectively disposed on the outer sides of rails 108, 110 proximate inner base 130. Inner base 130 and outer bases 132, 134 may preferably be formed of steel or another suitable metal material and may be welded to rails 108, 110. Additionally, in some embodiments, gussets 136 may be welded between outer bases 132, 134 and rails 108, 110.

In the illustrated subframe 119, outer bases 132, 134 preferably have pairs of apertures 138 defined therein for securing lugs 120-26 thereto. Likewise, mounting bosses 140 may be provided on inner base 130, and apertures 142 may be defined in bosses 140 and inner base 130 for securing lugs 120-26 thereto. Each lug 120-26 may be secured to subframe 119 via a respective set of fasteners received in respective apertures 138, 142.

Subframe 119 is configured to have a low profile and not to interfere with any known chassis components, such as the drivetrain or pusher axles. However, those of skill in the art will further understand that the configuration of subframe 119 may depend on the type of chassis with which embodiments of the present invention is used. Thus, for example, subframe 119 need not comprise outer bases 132, 134 in all embodiments. Indeed, in other embodiments, subframe 119 is not required at all, and cylinders 102, 104 and lugs 120-26 may be coupled directly to the chassis carrying the tank that is to be secured.

Figure 4:
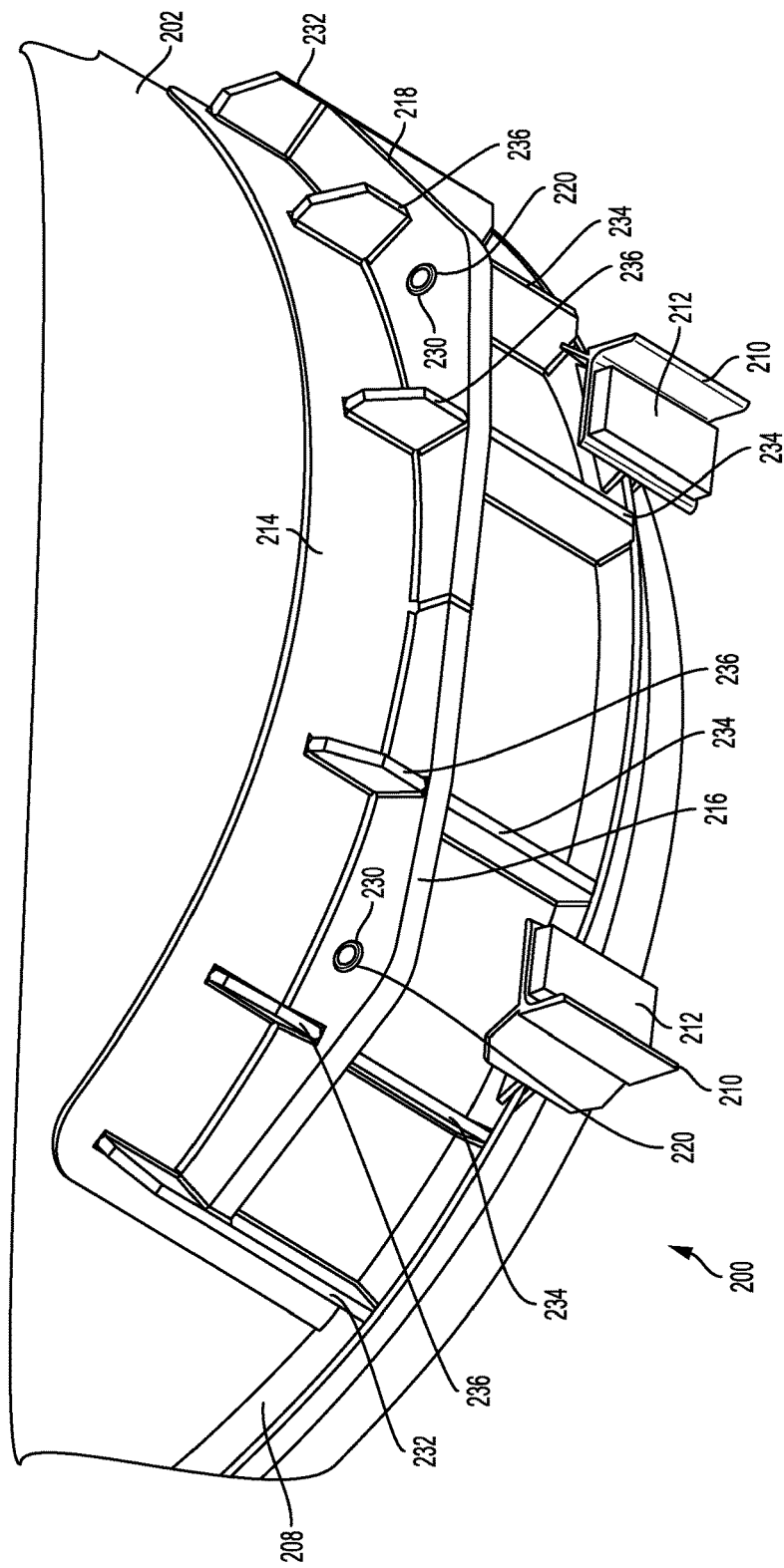
FIG. 4 is a partial perspective view of a tank and tank assembly in accordance with an embodiment of the present invention.
Figure 5:
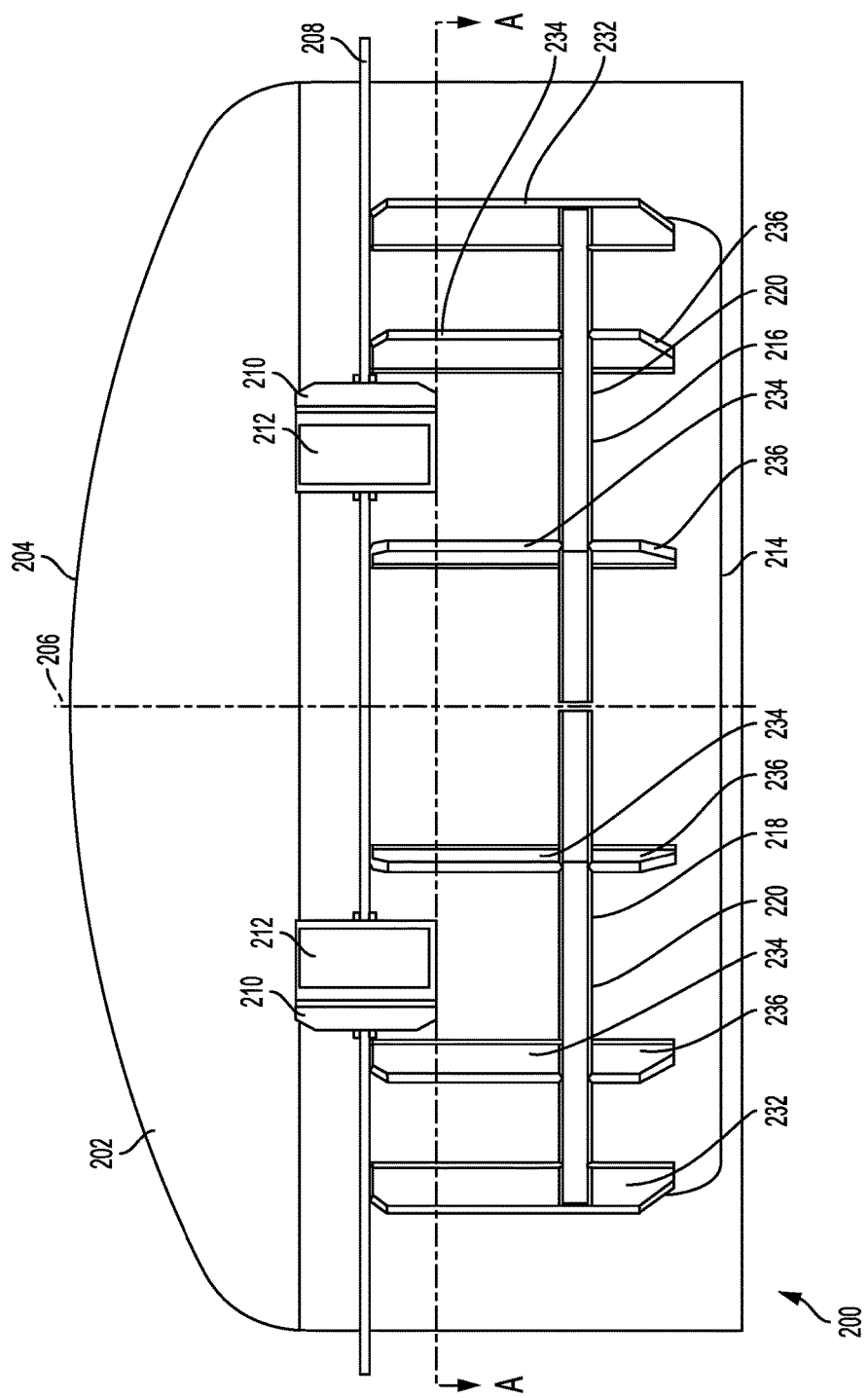
FIG. 5 is a partial plan view of the tank assembly of FIG. 4.
Figure 6:
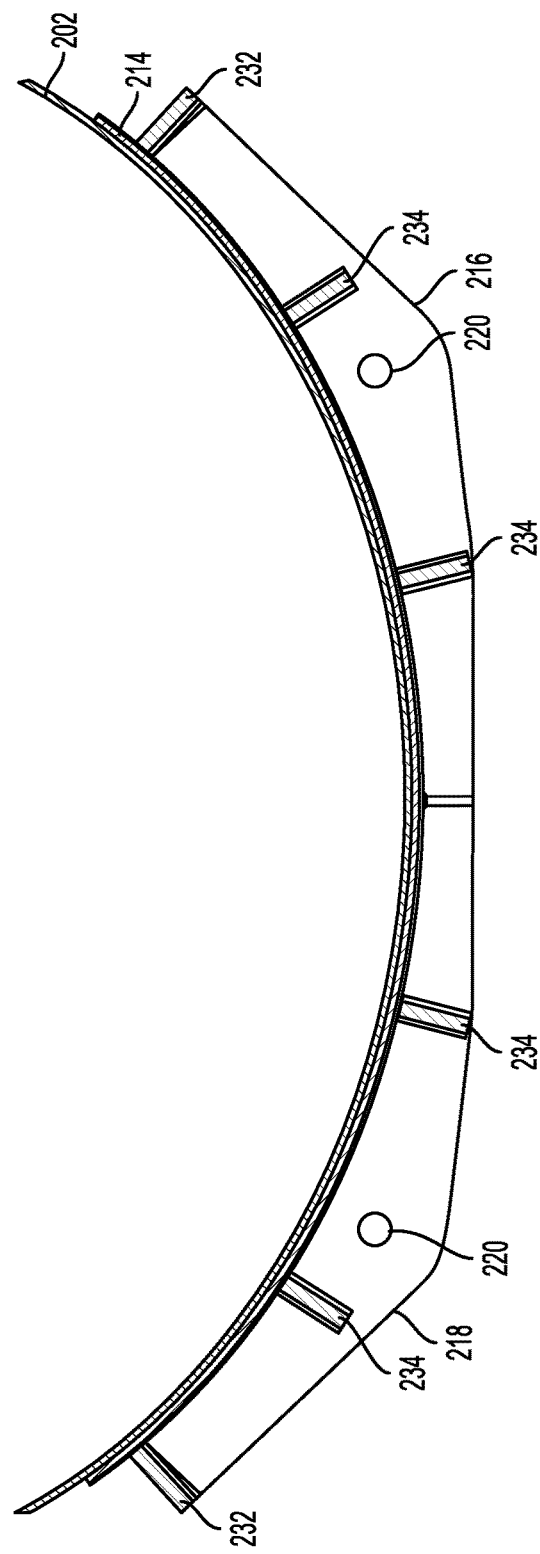
FIG. 6 is a section view taken along the line A-A in FIG. 5.

Next, FIGS. 4-6 illustrate a tank assembly 200 coupled with a tank 202 in accordance with an embodiment of the invention. FIG. 4 is a partial perspective view of tank assembly 200, and FIG. 5 is a partial plan view of tank assembly 200. FIG. 6 is a section view taken along the line A-A in FIG. 5.

Referring to FIGS. 4-6, tank 202 may comprise a cylindrical pressure vessel having a first, open end (not shown) and a second, closed end 204. In other embodiments, however, tank 202 need not be cylindrical in shape, and may instead take any suitable shape for a tank that can be used for collecting and transferring flowable materials. Tank 202 is preferably configured as a vacuum collection tank for collecting, transporting, and dumping flowable materials. For example, tank 202 may be analogous to tank 12 described above with respect to FIG. 1, and thus tank 202 may comprise a door that selectively covers the open end analogous to door 22 in FIG. 1. As shown in FIG. 5, tank 202 may have a centerline 206. In some embodiments, tank 202 preferably complies with the standards set forth in ASME Boiler and Pressure Vessel Code Section VIII, Division 1.

Figure 7:
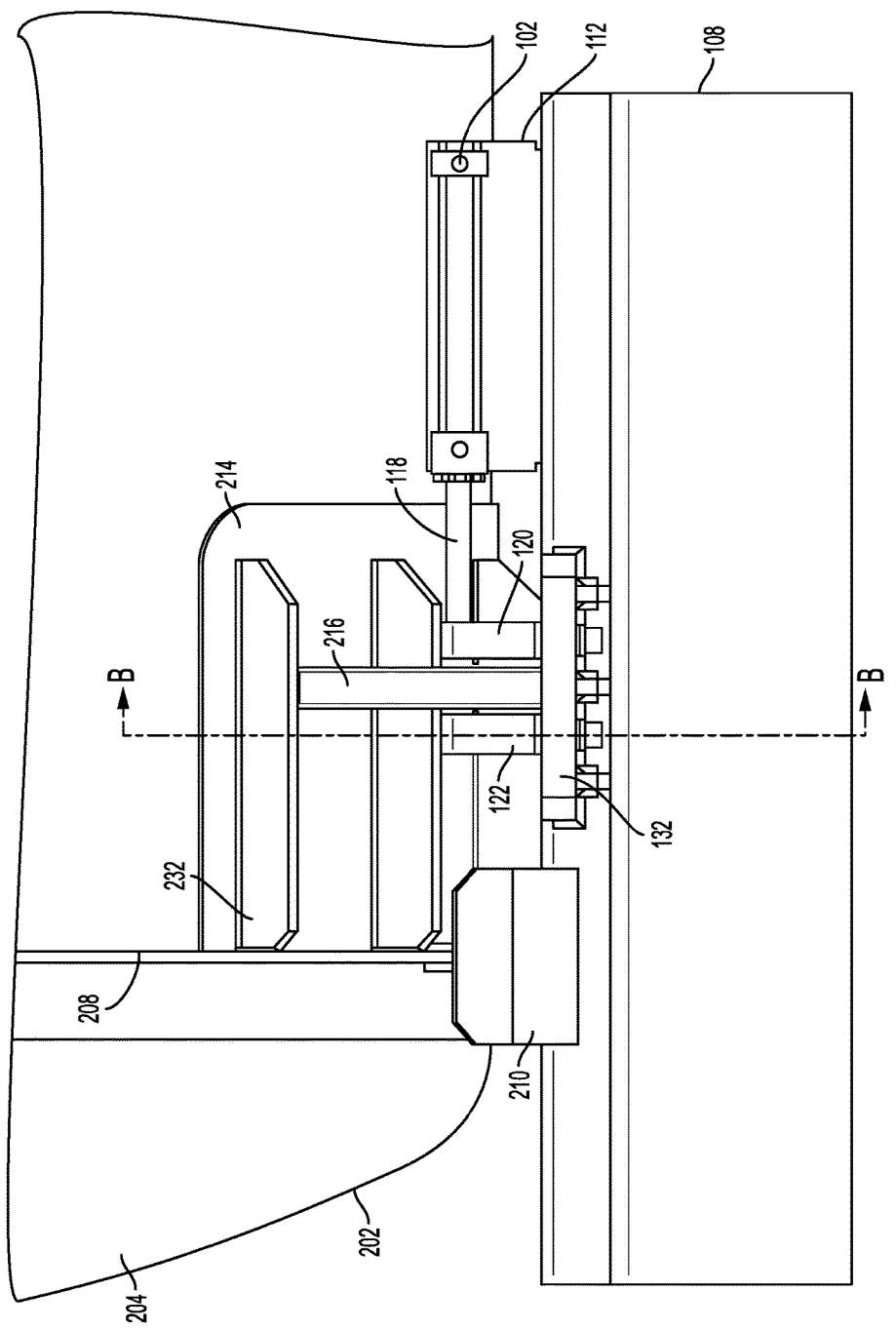
FIG. 7 is a partial side elevation of the tank of FIGS. 4-6 coupled with the chassis of FIGS. 2-3 showing the fluid cylinder in a retracted position.
Figure 10:
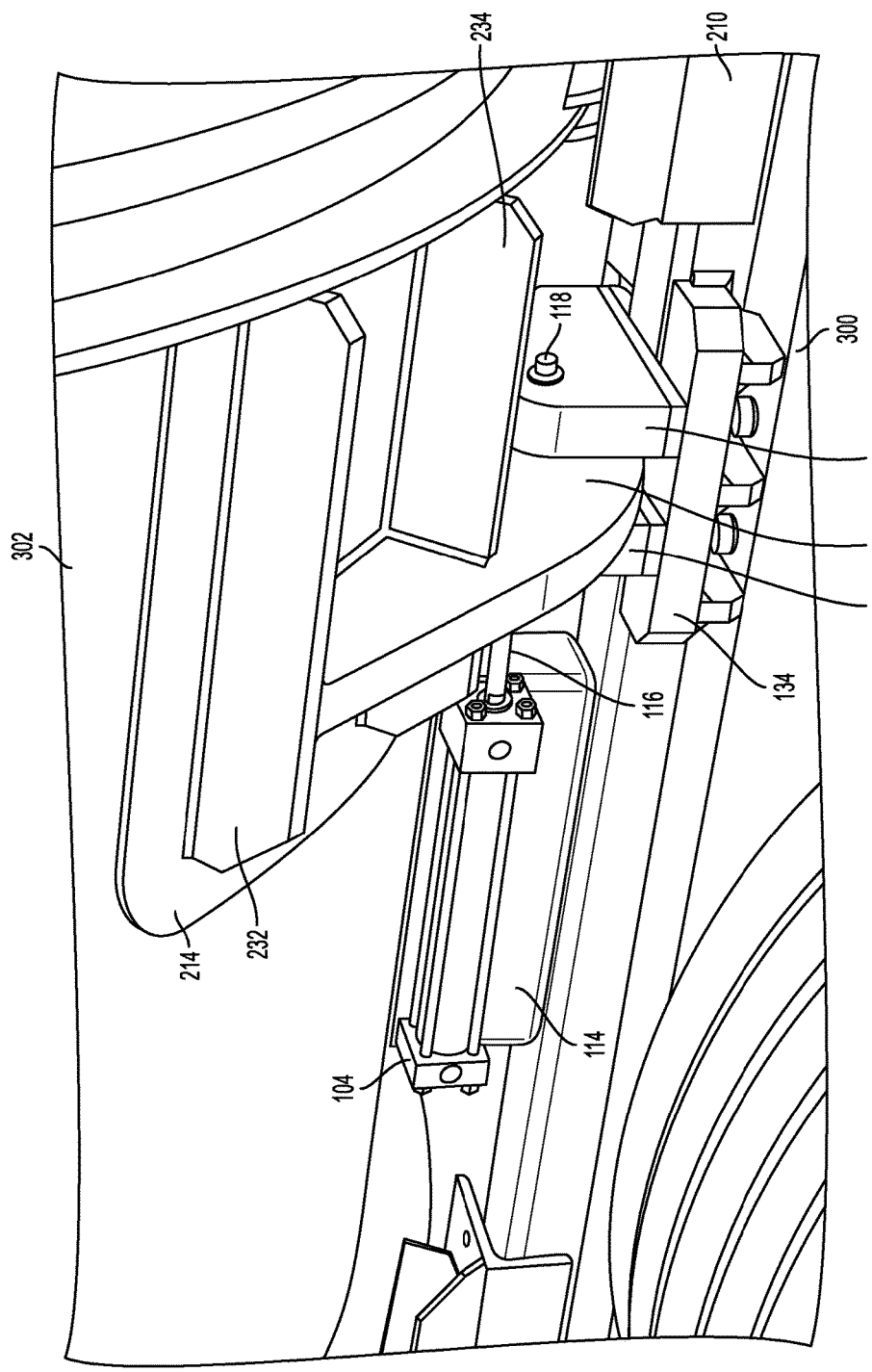
FIG. 10 is a detail perspective view of the chassis of a vacuum truck having a system in accordance with an embodiment of the present invention.

Further, as those of skill in the art will appreciate, tank 202 may comprise a plurality of circumferential stiffening rings 208 spaced along its length. One such ring 208 is shown in FIGS. 4-5. In the embodiment shown, tank 202 may also comprise a pair of feet 210 that are coupled with ring 208. Feet 210 may have pads 212 secured on an underside thereof. As can be seen in FIGS. 7 and 10, when tank 202 is in a lowered position, pads 212 of feet 210 may rest on chassis 106.

In the illustrated embodiment, tank assembly 200 comprises a structural pad 214 coupled with an underside of tank 202, and first and second ribs 216, 218, which are coupled with and extend downward from structural pad 214. More particularly, those of skill in the art will appreciate that, in some embodiments and for certain pressure vessels, applicable standards specify that load bearing members not be welded directly to the pressure vessel itself. Accordingly, although structural pad 214 is not required in all embodiments, in the illustrated embodiment structural pad 214 may be welded to the bottom of tank 202 and may help distribute any load applied to tank 202 via ribs 216, 218. Here, pad 214 may be centered about centerline 206 and disposed adjacent (and also welded to) tank ring 208.

It is preferred that pad 214 (when used) be disposed proximate the closed end 204 of tank 202, but in other embodiments pad 214 may be moved along the length of tank 202 without departing from the present invention. However, it will be appreciated that the location of pad 214, and of ribs 216, 218 on pad 214, is preferably selected such that, when tank 202 is in a horizontal position resting on chassis 106, ribs 216, 218 are received between respective pairs of lugs 120-22 and 124-26. Pad 214 also need not be coupled directly to ring 208 in all embodiments.

Pad 214, which is preferably formed of a suitable metal, such as steel, is preferably sized to support all other components of tank assembly 200. Those of skill in the art will appreciate that pad 214 may also be sized and shaped based on the size of the vessel to which it will be coupled. In one non-limiting embodiment, for a tank having a diameter of 72", pad 214 may have a width of about 20.3", and a length (measured horizontally from edge to edge, not along the circumference of tank 202) of about 56.4" when affixed to tank 202. Likewise, the material selected for pad 214 may depend on the material used for tank 202, as those of skill in the art will appreciate. In some embodiments, the size of pad 214 may be standardized for various tank diameters and materials.

As noted above, ribs 216, 218 are coupled with tank 202 via structural pad 214 in this embodiment. Ribs 216, 218 may be welded to pad 214 and are centered about centerline 206, as shown. Also, ribs 216, 218 preferably extend laterally at right angles to centerline 206. Ribs 216, 218 are preferably formed of a metal materials, such as steel, suitable for supporting tank 202 under the operating and emergency conditions described herein. In one non-limiting embodiment, again for a 72" tank diameter, ribs 216, 218 may each be about 1.5" thick, 28.7" in length, and 13.3" in height. Although two ribs 216, 218 are illustrated, those of skill in the art will appreciate that a single rib may be provided in other embodiments without departing from the present invention.

Ribs 216, 218 preferably each have an aperture 220 defined therethrough. As will be described below, apertures 220 are preferably disposed in a location on ribs 216, 218 at which apertures 220 are aligned with apertures 128 of lugs 120-26 when tank 202 is in a horizontal position, resting on chassis 106. In some embodiments, the locations of apertures 220 with respect to chassis 106 may be common for all sizes of tank 202 so that the chassis assembly 100 can be standardized. In general, apertures 220, as with apertures 128, are preferably sized to receive pins 118 associated with cylinders 102, 104. Thus, apertures 220 may serve as anchoring points for tank assembly 200 and tank 202. In some embodiments, though, each aperture 220 may be interference fit with a bushing that itself is sized to receive a pin 118. Such a bushing may preferably be hardened to resist wearing out. For example, bushings 230 are illustrated in FIG. 4.

As will be appreciated, the size and shape of ribs 216, 218 depends on the desired strength of ribs 216, 218, including in emergency conditions, the characteristics of tank 202, and the amount of space available between tank 202 and chassis 106. One preferred shape for ribs 216, 218 is illustrated in FIG. 6, but those of skill in the art will understand that other shapes are contemplated and within the scope of the present invention. As shown, ribs 216, 218 are generally shaped such that their inner, or top, surfaces conform to the circumference of tank 202 and/or pad 214. The cross-sectional area of ribs 216, 218 may vary along the circumference of tank 202 and/or pad 214, becoming larger in the area of apertures 220, and becoming smaller as the ribs 216, 218 respectively approach centerline 206.

In addition, in some embodiments circumferential ribs 216, 218 may be further supported by additional ribs or supports which extend longitudinally along tank 202, for example parallel with centerline 206. In this regard, welded to pad 214, on the outer lateral edge of each rib 216, 218, and to ring 208 may be a unitary cross rib 232. As shown, cross ribs 232 extend axially from ring 208 beyond the rear of ribs 216, 218. Further, one or more forward ribs 234 may extend axially between ring 208 and each of ribs 216, 218. Forward ribs 234 may be welded to ring 208, to pad 214, and to the respective rib 216, 218 they support. In the figures, four such forward ribs 234 are shown, though fewer or more than four such ribs may be provided in other embodiments. Similarly, one or more aft ribs 236 may extend axially on the rear side of each rib 216, 218 (i.e., away from closed end 204 of tank 202). Aft ribs 236 may also be welded to pad 214 and to the respective rib 216, 218 they support. Again, while four such aft ribs 236 are shown in the figures, fewer or more than four such ribs may be provided, as needed or desired. As shown in FIG. 5, ribs 232, 234, and 236 may be generally parallel with centerline 206 of tank 202.

Figure 8:
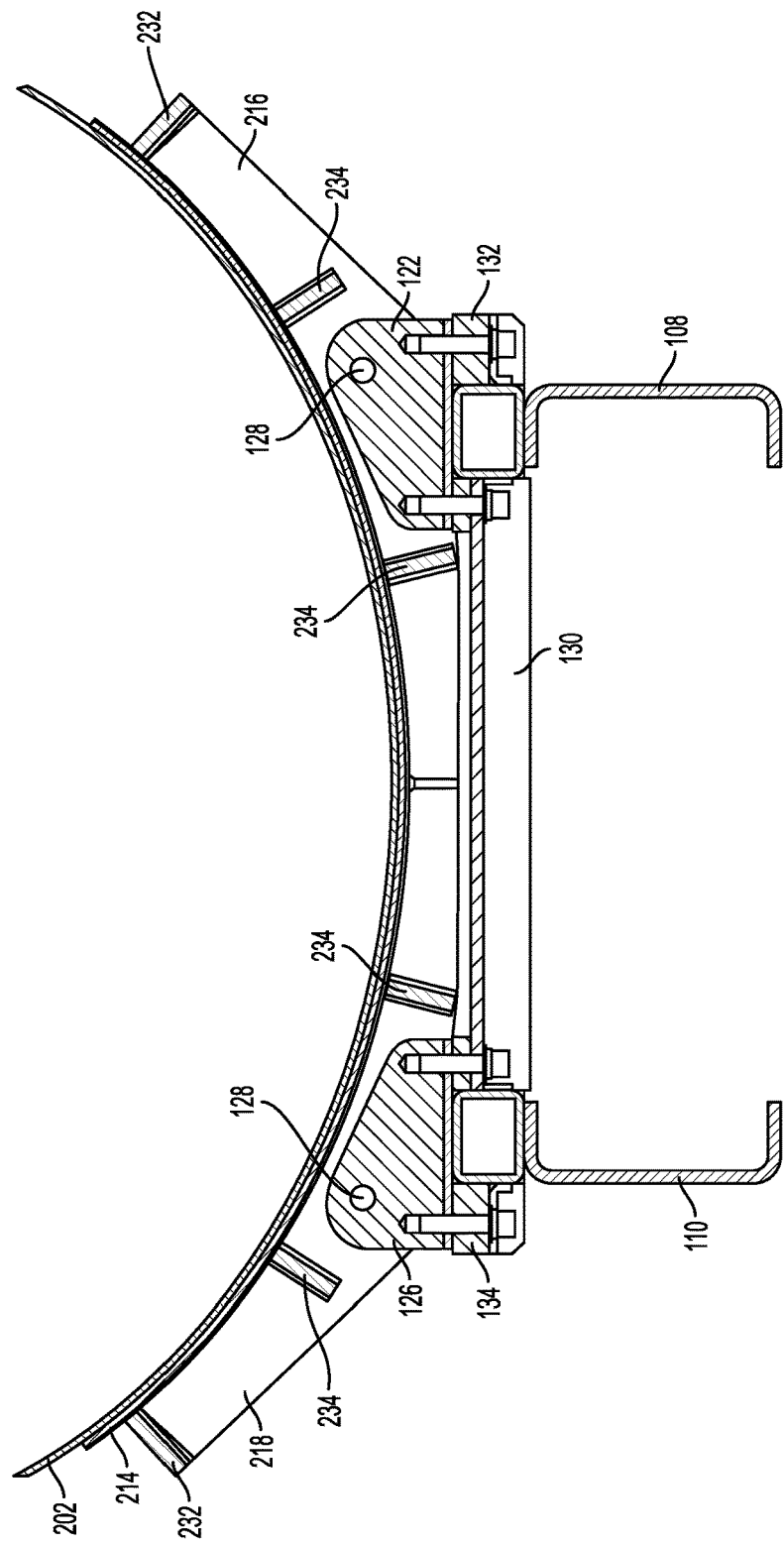
FIG. 8 is a section view taken along the line B-B in FIG. 7.
Figure 9:
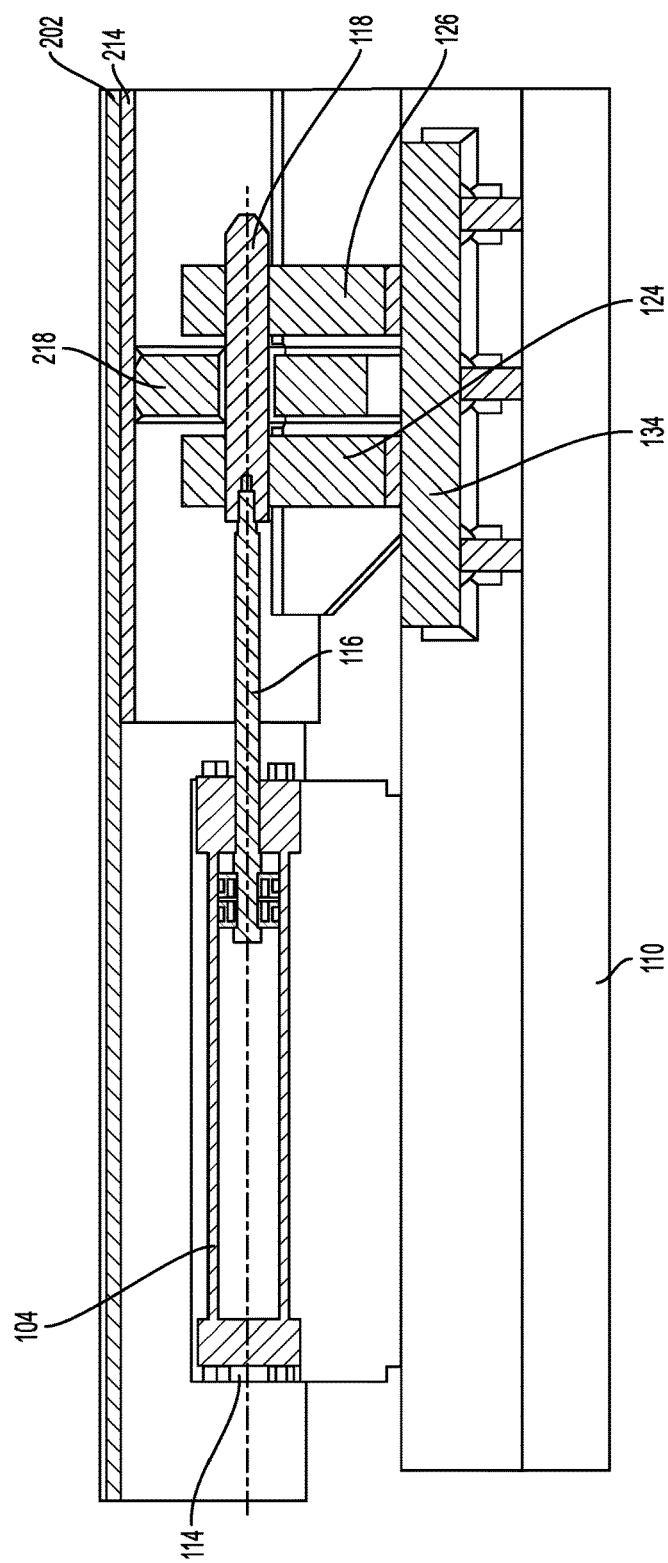
FIG. 9 is a detail section view of a tank assembly coupled with a chassis assembly in accordance with an embodiment of the present invention showing the fluid cylinder in an extended position.

Operation of an embodiment of the present invention will be described with reference to FIGS. 7-9. FIG. 7 is a partial side elevation of the tank of FIGS. 4-6 coupled with the chassis of FIGS. 2-3. FIG. 8 is a section view taken along the line B-B in FIG. 7. FIG. 9 is a detail section view of tank assembly 200 coupled with chassis assembly 100.

Referring first to FIGS. 7 and 8, when an operator desires to secure tank 202 to chassis 106, for example after the contents of tank 202 have been emptied, the operator may actuate a lift cylinder coupled with tank 202 (e.g., analogous to cylinder 26 described above) to lower tank 202 onto chassis 106. In this case, as shown in FIG. 7, feet 210 of tank 202 may rest on rails 108, 110 of chassis 106. Further, when tank 202 is in this position, ribs 216, 218 are received between respective pairs of lugs 120, 122 and 124, 126. Pins 118 associated with cylinders 102, 104 are in a retracted position at this time. Likewise, as can be seen in FIG. 8, apertures 128 of lugs 120-26 and apertures 220 of ribs 216, 218 are aligned in this position.

Referring also to FIG. 9, the operator may then actuate an appropriate valve in a fluid system in fluid communication with cylinders 102, 104, causing fluid to flow into and out of cylinders 102, 104. Accordingly, piston rods 116 and pins 118 will be caused to move from the retracted position shown in FIG. 7 to the extended position, which is shown in FIG. 9. Here, pin 118 associated with cylinder 104 has been received in apertures 128 and 220, thereby resisting movement of rib 218 with respect to lugs 124, 126. As described above, embodiments of the present invention are designed to withstand static loading in multiple directions, and they may resist relative motion between the tank and the chassis. As a result, tank 202 will be prevented from separating from chassis 106 during movement of chassis 106 and during emergency conditions, such as a vehicle collision or rollover.

When it is desired to unlock tank 202 from chassis 106, the operator may again actuate a valve in the fluid system, causing fluid to flow into and out of cylinders 102, 104 in the opposite direction. Accordingly, piston rods 116 and pins 118 will be caused to move from the extended position shown in FIG. 9 to the retracted position shown in FIG. 7. The operator may then actuate a lift cylinder to raise tank 202 with respect to chassis 106, for example to empty its contents.

As noted above, embodiments of the present invention may be used with any type of mobile vacuum equipment, including vacuum trucks and trailers carrying vacuum equipment. In this regard, FIG. 10 is a detail perspective view of the chassis 300 of a vacuum truck having a system in accordance with the embodiment described above. Embodiments of the present invention may be used with any type of vacuum truck. For example, the vacuum truck shown in FIG. 10 may be analogous to the Mastervac, Tubovac, or Duravac models offered by Wastequip-Cusco, a brand of Wastequip, LLC located in Ontario, Canada. In any event, as shown, a chassis assembly 100 may be coupled with chassis 300, and a tank assembly 200 may be coupled with a tank 302. In FIG. 10, pin 118 associated with cylinder 104 is shown in the extended position, passing through lugs 124, 126 and rib 218, thereby locking tank 302 to chassis 300.

Figure 11:
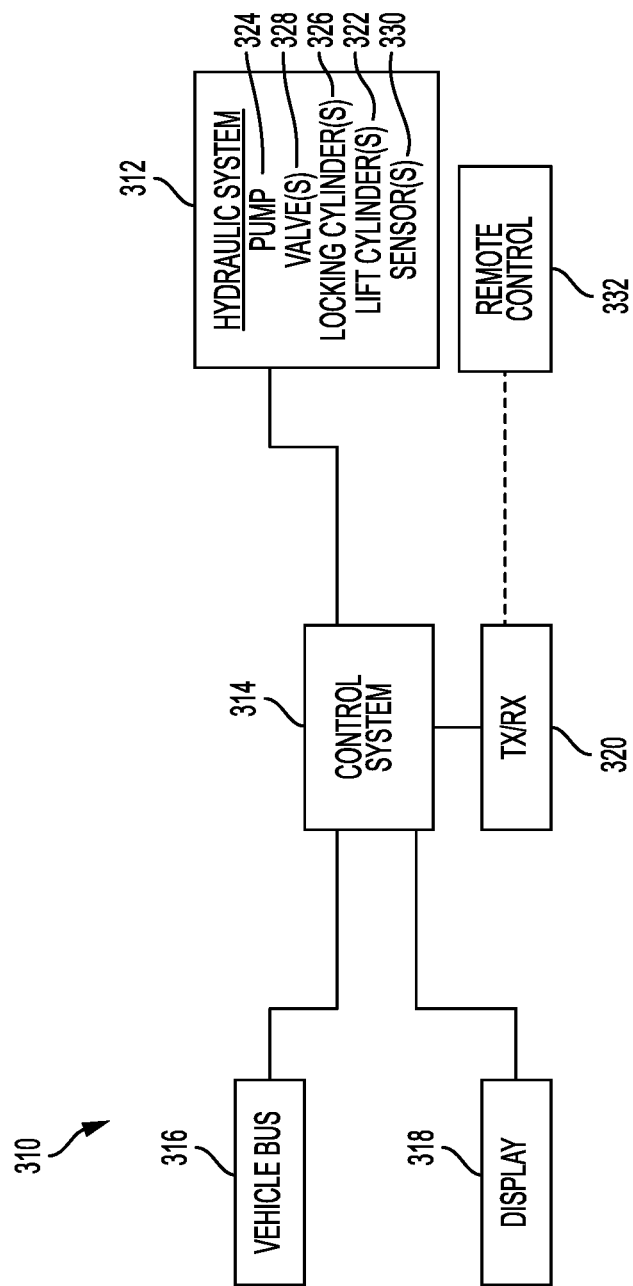
FIG. 11 is a block diagram of a control system for a vehicle employing a system in accordance with an embodiment of the present invention.

According to a further embodiment, the present invention may be controlled by a vehicle control system. For example, FIG. 11 is a block diagram of a system 310 for controlling a vehicle employing an embodiment of the present invention. For example, the vehicle may be similar to truck 10 described above, but modified in accordance with the present invention. In the embodiment shown in FIG. 11, the vehicle comprises a hydraulic system 312, and thus hydraulic fluid is the operating fluid for cylinders 102, 104 in this embodiment.

In general, system 310 comprises a control system 314 that interfaces with various vehicle components. For example, control system 314 may be in operative electronic communication with hydraulic system 312, a vehicle bus 316, and a display 318. In some embodiments, system 310 may also comprise a transceiver 320 to facilitate remote, wireless operation of the present invention.

Control system 314 may be any suitable electronics with associated memory and software programs running thereon whether referred to as a processor, microprocessor, controller, control module, microcontroller, or the like. Control system 314 preferably comprises the hardware and software necessary to operate various aspects of system 310 as described herein. Those of skill in the art are familiar with suitable vehicle control systems for controlling aspects of embodiments of the present invention.

The memory of control system 314 may be any suitable memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. Control system 314 may also include a portion of memory accessible only to control system 314.

Hydraulic system 312 preferably comprises components used to actuate and control one or more lift cylinders 322, such as the lift cylinders described above. In this regard, hydraulic system 312 may comprise a flow path along which a pump 324 (e.g., a hydraulic gear pump coupled with a shaft turned by the vehicle's engine) may pump hydraulic fluid to and from one or more lift cylinder(s) 322 and to one or more locking cylinders 326, such as fluid cylinders 102, 104 described above. One or more valves 328 are preferably located along the flow path between the pump 324, the lift cylinder(s) 322, and the locking cylinder(s) 326. In particular, valves 328 may be proportional valves located in a valve group coupled with the vehicle's chassis, and each valve 328 may comprise one or more spools, the movement of which controls the flow of a hydraulic fluid, such as oil, through valves 328. Valves 328 may be actuated electrically, such as by a proportional electrical actuator, by control system 314, or they may be air-over-hydraulic valves.

Hydraulic system 312 may further comprise one or more sensors 330 in operative electronic communication with control system 314. In this regard, sensors 330 may be position sensors operative to transmit to control system 314 information representative of the extension or retraction of lift cylinder(s) 322 and/or the extension or retraction of locking cylinder(s) 326. In addition or in the alternative, sensors 330 may be pressure sensors that transmit to control system 314 information representative of the pressure of hydraulic fluid in lift cylinder(s) 322 and/or locking cylinder(s) 326. In some embodiments, the sensors 330 may be embedded in cylinder(s) 322 and/or 326, and in other embodiments sensors 330 may be coupled with a pin associated with a locking cylinder 326. Those of skill in the art are familiar with suitable sensors 330 for this purpose. Additional information regarding hydraulic systems and circuits for hoist apparatuses is provided in U.S. Pat. No. 8,297,904 to Schroeder; U.S. Pat. No. 6,648,576 to Duell et al.; and U.S. Pat. No. 5,088,875 to Galbreath et al. and in U.S. Pre-Grant Pub. Nos. 2009/0025378 to Laumer et al. and 2006/0285952 to Galbreath et al., the entire disclosures of each of which are incorporated by reference herein for all purposes.

Those of skill in the art are also familiar with communications between electronic modules internal to vehicles, such as an engine control unit, transmission control unit, and the like. In this regard, vehicle bus 316 may comprise a communications network internal to the vehicle with which control system 314 is associated for the speedy and reliable exchange of data between vehicle components. Any suitable communications protocol may be used on bus 316, such as Controller Area Network (CAN) and Local Interconnect Network (LIN), among many others. In one embodiment, the protocol may be the Society of Automotive Engineers (SAE) J1939 protocol used for commercial vehicles. Control system 314 may preferably interface with vehicle bus 316 to receive data from and communicate with the other electronic components or nodes located along vehicle bus 316.

Display device 318 may be any suitable device having an interface for conveying information to and receiving information from an operator of the vehicle. Display device 318 is preferably in wired or wireless electronic communication with control system 102, and in one embodiment device 318 may comprise a vehicle dashboard display. In particular, display device 318 may comprise a processor and memory configured to generate a graphical user interface from which an operator of a vehicle may remotely control various aspects of system 310. In one embodiment, an operator may use an input device associated with display device 318 to send commands to control system 314, and in another embodiment, display device 318 may comprise a touch-screen. In any event, an operator may preferably use display device 318 to operate embodiments of the invention described herein.

As noted above, in some embodiments system 310 may comprise a transceiver 320 to enable an operator to remotely actuate locking cylinder(s) 326 and/or lift cylinder(s) 322. Those of skill in the art will appreciate, however, that system 310 need not comprise a remote actuation feature in all embodiments. In this regard, transceiver 320 may comprise any transceiver known to those of skill in the art that is suitable for wireless communications with a remote control unit 332. In one embodiment, transceiver 320 may comprise a wireless radio operative to communicate with remote control unit 332 using radio frequency signals with wavelengths in the ISM radio bands, though this is not required in all embodiments. In some embodiments, wireless communications may be implemented using a suitable short-range communications protocol, such as NFC, Bluetooth Low-Energy (also known as Bluetooth Smart), Peanut, Zigbee, Wi-Fi, or the like, though any suitable wireless communication protocol may be used with embodiments of the present invention.

In one embodiment, information regarding the position of sensors 330 is displayed to a user on display 318. For example, if pins 118 are engaged with lugs 120-26, and the tank 202 is secured to chassis 106, an indicator or light on display 318 may convey this to a user. Likewise, if pins 118 are disengaged and the tank 202 is not secured to chassis 106, a similar indicator may appear on display 318. If, for example, the user were to attempt to move the vehicle while tank 202 is not secured, a warning indicator may be displayed. Alternatively or in addition, control system 314 may prevent the vehicle from moving until the tank 202 is secured to chassis 106. Furthermore, where the pins 118 are engaged and the tank 202 is secured to chassis 106, control system 314 may prevent the user from attempting to actuate lift cylinders 322 to raise and/or empty tank 202. This will prevent twisting of and potential damage to tank 202.

Based on the above, it will be appreciated that embodiments of the invention provide a unique system for securing a collection tank to a chassis. In some preferred embodiments of the present invention, fluid-actuated cylinders disposed on the chassis are operative to move a piston rod or pin into and out of engagement with a circumferential rib disposed on the tank. This prevents the tank from lifting away from the vehicle or rupturing during operation and emergency situations. Those of skill in the art will appreciate that a system in accordance with embodiments of the invention may restrain a tank from movement with respect to a chassis under various operational and emergency load cases while at the same time preserving the integrity of the vessel under applicable standards. Embodiments of the present invention may be provided as a generic kit that can be applied to any standard truck chassis and to any tank having various specific diameters. The load capacity for each component in the kit may be tailored to the heaviest tank for each specific tank diameter to accommodate all tanks of that size. Moreover, the use of common components among kits, where possible, may reduce the cost of manufacture and/or implementation.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A vehicle having a front portion and a rear portion, comprising:
   a chassis having a chassis longitudinal axis extending between the front and rear portions of the vehicle;
   a tank, the tank having a tank longitudinal axis extending between the front and rear portions of the vehicle, a cross-section, a first end, and a second end, the cross-section having a circumference;
   the tank pivotably coupled with the chassis at the tank first end;
   the tank operative to move between a first position, at which the tank second end is proximate the chassis and the chassis and tank longitudinal axes are substantially parallel, and a second position, at which the tank second end is raised above the chassis and the tank longitudinal axis is at a non-zero angle relative to the chassis longitudinal axis;
   a locking mechanism coupled with the chassis;
   at least one arcuate rib projecting from and extending circumferentially about the tank;
   wherein the locking mechanism and the at least one rib of the tank are in engagement when the tank is in the first position.

2. The vehicle of claim 1, wherein the chassis comprises a pair of longitudinal rails, and the at least one rib comprises two ribs.

3. The vehicle of claim 2, wherein the locking mechanism comprises at least one lug coupled with each of the longitudinal rails.

4. The vehicle of claim 3, wherein the locking mechanism further comprises a fluid cylinder coupled with each of the rails.

5. A vehicle, comprising:
   a chassis, the chassis comprising a pair of longitudinal rails;
   a tank, the tank having a cross-section, a first end, and a second end, the cross-section having a circumference;
   the tank pivotably coupled with the chassis at the tank first end;
   the tank operative to move between a first position at which the tank second end is proximate the chassis and a second position at which the tank second end is raised above the chassis;
   a locking mechanism coupled with the chassis, the locking mechanism comprising at least one lug coupled with each of the longitudinal rails, the locking mechanism further comprising a fluid cylinder coupled with each of the rails;
   two ribs projecting from the tank, the ribs disposed about a portion of the circumference of the tank cross-section;
   wherein the locking mechanism and the ribs of the tank are in engagement when the tank is in the first position;
   wherein a pin coupled with each of the fluid cylinders is operative to extend through a respective one of the at least one lugs and ribs to secure the tank to the chassis.

6. The vehicle of claim 5, wherein each of the fluid cylinders comprises a spring that biases respective piston rods of the fluid cylinders to an extended position.

7. The vehicle of claim 1, wherein the vehicle is a vacuum truck.

8. The vehicle of claim 1, wherein the at least one rib is secured to the tank via a structural pad.

\* \* \* \* \*